UNITED STATES PATENT OFFICE.

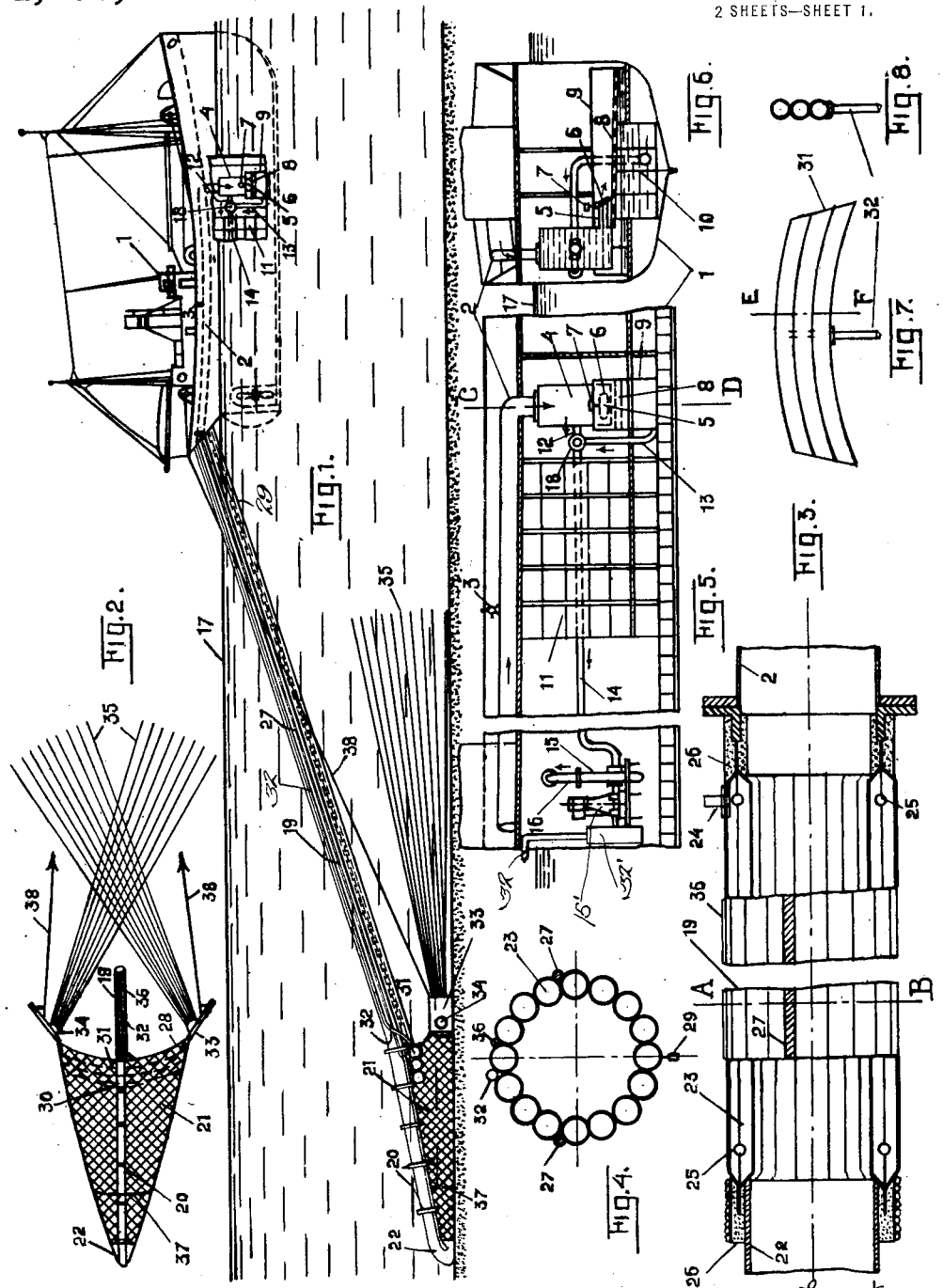

CORNELIS PIETER DROS, OF AMSTERDAM, NETHERLANDS.

TRAWLING AND LIKE FISHING APPARATUS.

1,388,414.  Specification of Letters Patent.  Patented Aug. 23, 1921.

Application filed March 29, 1919. Serial No. 286,154.

*To all whom it may concern:*

Be it known that I, CORNELIS PIETER DROS, consulting engineer, subject of Holland, residing in Amsterdam, Netherlands, Heerengracht No. 125, have invented certain new and useful Improvements in Trawling and like Fishing Apparatus, of which the following is a specification.

This invention relates to apparatus for catching fish; and its object, stated briefly, is the provision of an improved apparatus of the general character indicated which is so constructed as to overcome the main disadvantages inherent in trawl fishing as usually carried out, viz: the necessity for periodically drawing in the net, emptying it and re-casting it; the liability of the fish being injured or dead when hauled in; the inability to determine the presence or absence of fish in the water through which the net is being drawn; and the great resistance offered by the net to its passage through the water. Attempts have been made to design trawl-fishing apparatus in which one or more of the above objectionable features are avoided; but such attempts have hitherto proven unsuccessful, especially in the case of apparatus for deep-sea fishing, and the apparatus, furthermore, have been found unseaworthy and unsatisfactory for use in rough weather.

According to the present invention, however, the improved fishing apparatus comprises a catching or receiving compartment immediately in rear of the net, and the fish are discharged from this compartment and caused to travel in a definite path of the trawling vessel; for which purpose a tubular extension or conduit is connected at one end with said compartment and at the other end with a piping system provided on the vessel and from which they are delivered to a catching station in the vessel located adjacent the hold or holds.

The invention further resides in the provision of means for attracting the fish toward the net by artificial light; for accelerating the movement of the water and fish through the extension or conduit either by suction or by pressure, and for separating the fish on reaching the catching station; for enabling the construction of the conduit of light, flexible material while at the same time preventing its collapse under the suction action; for effecting an adjustment of the net to lie either upon the bottom or at such a distance thereabove as may be best suited to existing conditions; and for preventing choking of the conduit.

An embodiment of the invention is illustrated in the accompanying drawing, in which:

Figure 1 is a view showing the complete apparatus in use;

Fig. 2 is a plan view of the net and catching compartment;

Fig. 3 is a fragmental, part-sectional side elevation of the extension or conduit;

Fig. 4 is a cross-section on line A—B, Fig. 3;

Fig. 5 is a fragmental, longitudinal vertical section of the trawler;

Fig. 6 is a cross-section on line C—D, Fig. 6;

Fig. 7 is a plan view of the air float for adjusting the position of the net;

Fig. 8 is a cross-section on line E—F, Fig. 7; and

Figure 9:
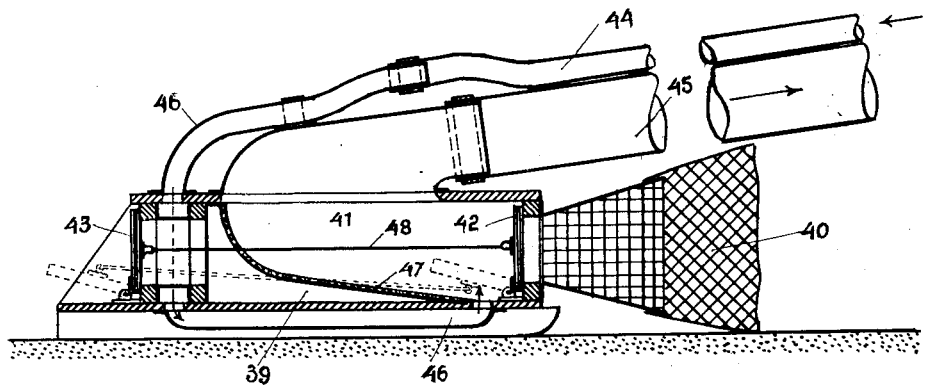
Fig. 9 is a longitudinal section of a modification in which pressure is utilized instead of suction to effect the movement of the water and fish through the conduit.

Referring more particularly to said drawings, 1 indicates, in a general manner, the trawler or other vessel, and 2 a siphon pipe which is disposed above its deck and connected to the conduit 19 subsequently described. The inner end of the siphon 2 is connected to a water tank 4, arranged within the hold of the vessel and having an outlet 5 located at a distance of about 2 meters below the water level (indicated at 17), said outlet being closed by means of a valve 6 equipped with a balance weight 7. Below the outlet 5 there is placed a grating 8 mounted in a discharge tank 9, which is provided with perforated, vertical partitions 10 and is disposed adjacent the fish holds 11. The tanks 4 and 9 are connected by pipes 12 and 13, respectively, to the suction pipe 14 of a marine centrifugal pump 15 driven by an engine 15′, a three-way valve 18 being arranged at the junction of said pipes so that communication can be established between pipe 14 and either pipe 13 or pipe 12, the discharge from pump 15 being effected through a pipe indicated at 16 (Fig. 5) which leads in some suitable way into the sea. The siphon 2 is also provided with a three-way valve 3, to permit the air to be exhausted from the siphon and the latter then filled with water to start its action, or to admit air to said siphon to terminate its action.

The outer end of the siphon pipe 2 has connected to it one end of a conduit 19, the other end of which is connected with the net 21 by means of straps 20, the conduit thus forming an extension of the siphon. This conduit is preferably constructed of light, flexible material, such as canvas, protected against the corrosive action of the sea water by being impregnated with a solution of rubber or other water-proofing material; and in order to overcome the tendency of the conduit to contract under the suction action created in it, particularly when the pump is in direct communication with the water tank 4, it may advantageously be constituted of an annularly-arranged set of tubes 23, the interiors of which are under pressure. The said tubes may be formed by superposing two layers of the rubber-saturated canvas and fastening them together by a number of longitudinal seams arranged in spaced, parallel relation, so that the space between each pair of adjacent seams will define a tube, the number of such seams and the distance between them determining the number and size of the tubes, as will be understood. The side edges, as well as the end edges of the two layers of fabric are, of course, stitched or otherwise fastened together to complete the formation of the tubes, one of which is furnished with an inlet 24 for the pressure water, which may be supplied thereto from some suitable source, communication between the adjacent tubes being obtained by omitting one or more of the stitches, as indicated at 25 (Fig. 3).

The outer end of the conduit is immediately attached to a catching compartment 22, which is located at the small end of the funnel-shaped net 21 and is secured directly to the same; and in order to obtain a water-tight joint both between this end of the conduit and the compartment 22, and between the other end of the conduit and the adjacent end of the siphon 2, rubber rings or gaskets 26 may be fitted over the opposite ends of the conduit in the manner represented in Fig. 3. Ropes 27 may be employed to relieve the conduit from tensile stresses, and may be fastened to the side walls of the conduit and secured at one end to the top rope 28 of the net and at the other end to the stern of the trawler.

The under side of the conduit may have fixed to it a chain 29 in order to overcome the tendency of the water pressure acting against the conduit to raise it during its towing movement; and it will be sufficient for that purpose if such chain have a weight of about 1 kilogram per meter, assuming that the bottom rope 30 of the net is weighted as usual. The water pressure thus being neutralized, the depth at which the net is to operate may be readily adjusted by employing an expansible and collapsible float 31 (Figs. 7 and 8), constructed of suitable light and strong material, as rubberized canvas, the float being attached to the net and provided with a flexible inlet tube 32, which is adapted to be connected to an air compressor 32' driven by the engine 15' (Fig. 5). The air compressor will be utilized to supply air under pressure to the float which will thus be expanded and, in rising, will pull the net up with it from the sea bottom or bed toward the surface of the water; and by regulating the amount of air delivered to the float it is possible to so vary the buoyancy of the float as to readily control its degree of submergence. The actual construction of the float may be generally similar to that of the conduit 19 as described above.

In order to attract the fishes from a distance toward the large open end or mouth of the net, the latter may be provided with lamps 34 of high candle power,—say, about 2000 candle power—which are fastened to the trawl boards 33 and are supplied with current from a dynamo on board the vessel by means of a conducting cable 36. This connection is preferably uni-polar, and the steel lines 38 attached to the trawl boards may be utilized as the return conductor. The lamps may be securely and firmly fastened to said boards and may be protected by suitable wire screens; and by equipping them with powerful reflectors, and making them adjustable, it is possible to cause the light rays 35 to penetrate the water for a considerable distance, and to so control their direction that a maximum zone or space in front and at the sides of the mouth of the net will be illuminated. A guard net or grating 37 may also be disposed within the net at the entrance to the catching compartment or throat 22, to prevent the passage thereinto of large objects or bodies which might tend to choke up the conduit 19. The meshes or openings of such net or grating will be slightly smaller than the inlet end of the said compartment or of the conduit which may vary in size from 20 centimeters for haddock, cod, herring and mackeral up to about 40 centimeters for flat fish. Larger sorts of fish, which will represent only a small percentage of the fish caught in the different seas, cannot pass through the meshes of the grating or guard net but will remain in the forward part of the trawling net.

The operation is substantially as follows—The conduit 19, after having been attached at one end to the siphon 2 and at the other end to the catching compartment or throat 22 of the trawling net 21, and after the ropes 27 have been fastened to the top rope 28 and to the stern of the vessel, is folded into the trawling net, which is thereupon thrown into the water and spread out in the usual way, at the same time paying out the air tube 32 and the electric cable 36. The conduit will unfold itself, and will extend the trawl board lines 38. When this has been done, the lamps 34 are lighted, the pressure water is admitted to the conduit tubes 23 and the valve 6 is closed, after which the siphon 2 is filled by exhausting the air through valve 3. Valve 6 is then opened, thereby permitting the water to flow through the conduit with a speed depending upon the difference of head between the discharge opening 5 and the water level 17 and upon the friction in the conduit. The fish caught in the net, after having passed through the guard or grating 37, are drawn with a great velocity through the compartment 22, the conduit 19 and the siphon tube 2 and are discharged upon the grating 8 over tank 9, from which they are removed and, after having been stripped, may be deposited in the holds 11. The water pouring out of the siphon with the fish, falls through the grating 8 into tank 9 and is exhausted therefrom by the pump 15 through the pipes 13, 14 and 16.

In fishing for cod, haddock and the like, the net is dragged over the sea bed or bottom, the float 31 being then empty of air and collapsed; but the net may readily be raised in order to locate the fish in cases where, as in herring fishing, the fish shoals are found above the bottom, by admitting air to the float, the quantity of fish discharged upon the grating determining when the shoal is reached. In case the catch takes such proportions that the ordinary action of the siphon is insufficient to empty the net, the valve 18 may be opened to connect up the pump 15 with the siphon through the pipes 14 and 12, thereby increasing the suction. The balanced valve 6 is automatically closed in such instance by a decrease of the pressure in tank 4 caused by the pump, but can be opened periodically to remove the fish which accumulate in said tank, the water being discharged therefrom through pipes 12, 14 and 16. At the same time that valve 6 is opened for the purpose stated, valve 18 is returned to connect pipes 13 and 14, so as to withdraw the water from the tank 9. When the fishing is to be ended, the pump 15 is stopped and air is admitted to the siphon pipe 2 to terminate its action, after which the pressure water is discharged from the conduit tubes 23, the conduit being thereafter hauled in in the usual way by winding up the lines 38 on the steam winch.

While the siphon arrangement above described is preferred by reason of its simplicity and high efficiency, it will be understood that the discharging of the fish and the water from the catching compartment in rear of the net and through the conduit may be effected by other than siphon action, though not so satisfactorily. Thus, other water-displacement devices, whether operated by steam, air or water pressure, may be utilized; for example, jets of steam, air or water. When using water pressure, the apparatus represented in Fig. 9 may be advantageously adopted, as very large hauls can be made with it, and as it is lighter, simpler and less costly than the siphon arrangement, although it does not work continuously.

In this form of the invention, the siphon tube, the discharge tank 9, and the tank 4 and its connections may all be omitted, and the water and fish may be discharged directly upon the deck of the vessel. The catching compartment takes the form of a box, as shown, and is divided interiorly by a curved grating 47 into front and rear chambers 41 and 39, the first of which constitutes the catching compartment proper and is attached at its front end, as before, to the rear portion of the net 40, said chamber or compartment being connected at its top to the lower end of the conduit 45. Communication between the net and the compartment 41 is controlled by a flap valve 42, and a similar valve 43 is employed to close and open the rear end of the compartment 39, the two valves being connected together by a rod or chain 48. The compartment 39 has connected to it a tube or pipe 46 of relatively small diameter as compared with the conduit 45 and comprising upper and lower sections or members which communicate, respectively, with the top and bottom of that compartment, the lower section leading forwardly and opening at its front end into the front end of the catching compartment 41. The upper section of tube 46 is connected to the lower end of a pipe or tube 44 which may be attached at its upper end to the previously-mentioned marine pump 15 on the vessel.

In operation, the net is towed through the water, which first opens the front valve 42 and then passes through the grating 47 and forces open the rear valve 43; the water thus escaping through the opening controlled by the latter valve and, consequently, being prevented from backing up in the catching compartment. The fish also enter said compartment; but since they cannot escape through the grating with the water, they will remain in the compartment and will collect therein and in the lower end of the conduit 45. To empty the compartment, water is forced under pressure by the pump through pipes 44 and 46 into and through chamber or compartment 39 and thence into compartment 41. On entering the latter compartment, the water will act against the valve 42 to close the same, since the pressure within the compartment will then exceed the outside pressure, the closing of valve 42 in turn effecting the closing of the outlet valve 43, due to the connection 48 between them. Hence, the water, in escaping, will be compelled to flow through the conduit 45, forcing the fish therethrough ahead of it and discharging them upon the deck of the vessel, where it may be drained off in some suitable way. The fish may, if desired, be then transported, automatically or otherwise, by means of known devices, to the fish holds for storage.

I claim as my invention:—

1. In a fishing apparatus, the combination of a catching station; a fishing net having a catching compartment; a flexible conduit consisting of an annular series of connected tubes adapted to contain a fluid under pressure, said conduit communicating at one end with said catching compartment; and means at the catching station associated with the other end of the conduit for causing the water and fish to pass from said catching compartment through said conduit to the catching station.

2. In a fishing apparatus, the combination of a fishing net having a catching compartment; a conduit connected at one end to said compartment; a siphon pipe connected to the other end of the conduit; a tank connected to the discharge end of the siphon pipe and having an outlet; a valve for closing said outlet; a separate tank located beneath said outlet and provided with a grating to separate the fish and water delivered immediately thereon by said outlet; and a pump to regulate the siphon action and connected to draw water from either of said tanks.

3. In a fishing apparatus, the combination of a fishing net having a catching compartment; a flexible conduit connected at one end to said compartment and comprising a tubular circumferential wall adapted to contain a fluid under pressure; and a pumping device communicating with the other end of the conduit for causing the water and fish to be lifted therethrough from the catching compartment.

4. In a fishing apparatus, the combination of a fishing net having a catching compartment; a flexible conduit connected at one end to said compartment and comprising an annular series of connected tubes adapted to contain a fluid under pressure; and a pumping device communicating with the other end of the conduit for causing the water and fish to be lifted therethrough from the catching compartment.

5. In a fishing apparatus, the combination of a fishing net having a catching compartment; a conduit connected at one end to said compartment; a buoyant device attached to the net for lifting it toward the surface of the water; and a pumping device communicating with the other end of the conduit for causing the water and fish to be lifted therethrough from the catching department.

6. In a fishing apparatus, the combination of a fishing net having a catching compartment; a conduit connected at one end to said compartment; a buoyant device attached to the net for lifting it toward the surface of the water; means for maintaining said device at a regulatable distance below the surface of the water; and a pumping device communicating with the other end of the conduit for causing the water and fish to be lifted therethrough from the catching compartment.

7. In a fishing apparatus, the combination of a fishing net having a catching compartment; a conduit connected at one end to said compartment; an expansible and collapsible float attached to the net for lifting it toward the surface of the water; and a pumping device communicating with the other end of the conduit for causing the water and fish to be lifted therethrough from the catching compartment.

8. In a fishing apparatus, the combination of a fishing net having a catching compartment; a flexible conduit connected at one end to said compartment and comprising a tubular circumferential wall adapted to contain a fluid under pressure; a buoyant device attached to the net for lifting it toward the surface of the water; and a pumping device communicating with the other end of the conduit for causing the water and fish to be lifted therethrough from the catching compartment.

9. In a fishing apparatus, the combination of a fishing net having a catching compartment; a flexible conduit connected at one end to said compartment and comprising a tubular circumferential wall adapted to contain a fluid under pressure; a pneumatic device attached to the net for lifting it toward the surface of the water; and a pumping device communicating with the other end of the conduit for causing the water and fish to be lifted therethrough from the catching compartment.

10. In a fishing apparatus, the combination of a fishing net having a catching compartment; a flexible conduit connected at one end to said compartment and comprising an annular series of connected tubes adapted to contain a fluid under pressure; a buoyant device attached to the net for lifting it toward the surface of the water; and a pumping device communicating with the other end of the conduit for causing the water and fish to be lifted therethrough from the catching compartment.

11. In a fishing apparatus, the combination of a fishing net having a catching compartment and adapted to be towed through the water behind a trawler; flexible connections between the trawler and the net including a conduit communicating at one end with said compartment; and a pumping device on the trawler communicating with the other end of the conduit for causing the water and fish to be lifted therethrough from the catching compartment.

12. In a fishing apparatus, the combination of a net having a catching compartment and adapted to be towed through the water behind a trawler; and an apertured guard disposed within the net at the entrance to said compartment.

13. In a fishing apparatus, the combination of a fishing net having a catching compartment and adapted to be towed through the water behind a trawler; flexible connections between the trawler and the net including a conduit communicating at one end with said compartment; a pumping device on the trawler communicating with the other end of the conduit for causing the water and fish to be lifted therethrough from said compartment; and an apertured guard disposed within the net at the entrance to said compartment to prevent large fishes from passing into and choking up said compartment and conduit.

14. In a fishing apparatus, the combination of a net adapted to be towed through the water; trawl boards movably connected to the opposite side edges of the net at the front end thereof; and electric lamps carried by said boards to move therewith and thereby illuminate the water in front and to the sides of the net.

In testimony that I claim the foregoing as my invention I have signed my name in presence of two subscribing witnesses.

CORNELIS PIETER DROS.

Witnesses:
D. KLÜYN,
M. ALVARADOS.